(12) United States Patent
Sakakibara

(10) Patent No.: US 11,731,522 B2
(45) Date of Patent: Aug. 22, 2023

(54) FAILURE DETERMINATION APPARATUS AND FAILURE DETERMINATION METHOD FOR RELATIVE POSITION ACQUISITION SYSTEM

(71) Applicant: HONDA MOTOR CO., LTD., Tokyo (JP)

(72) Inventor: Naoya Sakakibara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 396 days.

(21) Appl. No.: 17/208,288

(22) Filed: Mar. 22, 2021

(65) Prior Publication Data

US 2021/0306209 A1 Sep. 30, 2021

(30) Foreign Application Priority Data

Mar. 26, 2020 (JP) .................. 2020-056396

(51) Int. Cl.
| | |
|---|---|
| *H04L 41/0677* | (2022.01) |
| *H04W 4/02* | (2018.01) |
| *H04W 52/28* | (2009.01) |
| *H02J 50/40* | (2016.01) |
| *H02J 50/12* | (2016.01) |
| *H02J 50/80* | (2016.01) |
| *B60L 53/126* | (2019.01) |
| *G06F 16/22* | (2019.01) |
| *H04W 84/12* | (2009.01) |
| *H02J 50/90* | (2016.01) |
| *B60K 6/28* | (2007.10) |

(52) U.S. Cl.
CPC ........ *H04L 41/0677* (2013.01); *B60L 53/126* (2019.02); *H02J 50/12* (2016.02); *H02J 50/40* (2016.02); *H02J 50/80* (2016.02); *H04W 4/023* (2013.01); *H04W 52/283* (2013.01); *B60K 6/28* (2013.01); *B60Y 2200/91* (2013.01); *B60Y 2200/92* (2013.01); *B60Y 2300/91* (2013.01); *G06F 16/2282* (2019.01); *H02J 50/90* (2016.02); *H04W 84/12* (2013.01)

(58) Field of Classification Search
CPC ....... H04L 41/0677; H02J 50/80; H02J 50/12; H02J 50/40; B60L 53/126; H04W 4/023; H04W 52/283; G06F 16/2282; B60Y 2200/91; B60Y 2300/91
See application file for complete search history.

(56) References Cited

U.S. PATENT DOCUMENTS

| | | | | |
|---|---|---|---|---|
| 11,198,370 | B2 * | 12/2021 | Seong ................ | H02J 50/90 |
| 11,254,226 | B2 * | 2/2022 | Maikawa ............ | B60L 53/36 |
| 11,368,051 | B2 * | 6/2022 | Lee .................... | H02J 50/80 |
| 2021/0261007 | A1 * | 8/2021 | Böhler ............... | B60L 53/38 |

FOREIGN PATENT DOCUMENTS

JP 2016-32397 A 3/2016

* cited by examiner

*Primary Examiner* — Chandrahas B Patel
(74) *Attorney, Agent, or Firm* — WHDA, LLP

(57) ABSTRACT

An ECU in a failure determination apparatus receives a wireless LAN signal from a power-transmission-side wireless communication unit with a vehicle-side wireless communication unit and determines whether a relative position acquisition system fails based on whether predetermined expressions are established for the respective reception intensities of a low frequency signal at first to fourth power-transmission-side antennas, which are included in the wireless LAN signal.

8 Claims, 4 Drawing Sheets

FAILURE DETERMINATION APPARATUS AND FAILURE DETERMINATION METHOD FOR RELATIVE POSITION ACQUISITION SYSTEM

CROSS REFERENCES TO RELATED APPLICATIONS

The present application claims priority under 35 U.S.C. § 119 to Japanese Patent Application No. 2020-056396, filed Mar. 26, 2020, entitled "Failure Determination Apparatus and Failure Determination Method for Relative Position Acquisition System." The contents of this application are incorporated herein by reference in their entirety.

TECHNICAL FIELD

The present disclosure relates to a failure determination apparatus and so on for determining whether a relative position acquisition system fails.

BACKGROUND

An apparatus described in Japanese Unexamined Patent Application Publication No. 2016-32397 is heretofore known as a failure determination apparatus for a non-contact charging system. In the failure determination apparatus, any failure of a power supply stand is self-diagnosed in the power supply stand itself. Specifically, for example, any failure of a vehicle detection sensor and any disconnection of a power transmission coil are determined in the power supply stand.

SUMMARY

When an electric vehicle performs non-contact charging, it is necessary for the electric vehicle to be moved to the non-contact charging system and to be parked while a power reception unit of the vehicle is being aligned to a power transmission unit including a power transmission coil in the non-contact charging system. In order to realize such parking, it is necessary to use a relative position acquisition system that accurately acquires the relative position between the power transmission unit and the power reception unit. In contrast, with a failure determination apparatus in related art, it is difficult to determine whether the relative position acquisition system fails. Accordingly, it is desirable to provide a failure determination apparatus capable of accurately determining whether the relative position acquisition system fails.

The present application describes, for example, a failure determination apparatus and so on for a relative position acquisition system, which are capable of accurately determining whether the relative position acquisition system fails.

According to an aspect of the present disclosure, a failure determination apparatus is provided for a relative position acquisition system including a power reception unit that is mounted in a vehicle, a power transmission unit for transmitting power to the power reception unit in a non-contact method, a first antenna provided for the power reception unit, a first wireless communication unit that transmits and receives a wireless signal via the first antenna, second antennas of an m-number (m is an integer not smaller than three) provided for the power transmission unit, a second wireless communication unit that transmits and receives the wireless signal to and from the first wireless communication unit via the second antennas of the m-number and the first antenna, and a relative position acquisition unit that acquires a relative position between the power reception unit and the power transmission unit based on reception results of the m-number of the wireless signal received via the second antennas of the m-number when the wireless signal transmitted from the first wireless communication unit is received by the second wireless communication unit via the second antennas of the m-number. The failure determination apparatus includes a correlation storage unit that stores in advance correlation between the reception results of the m-number of the wireless signal at the second antennas of the m-number, an actual correlation acquisition unit that acquires actual correlation between the reception results of the m-number of the wireless signal received by the second wireless communication unit, and a failure determination unit that determines whether the relative position acquisition system fails based on a result of comparison between the correlation between the reception results of the m-number stored in the correlation storage unit and the actual correlation between the reception results of the m-number acquired by the actual correlation acquisition unit.

In the relative position acquisition system, when the wireless signal transmitted from the first wireless communication unit is received by the second wireless communication unit via the second antennas of the m-number, the relative position between the power reception unit and the power transmission unit is acquired based on the reception results of the m-number of the wireless signal, which are received via the second antennas of the m-number. With the failure determination apparatus for the relative position acquisition system, the correlation between the reception results of the m-number of the wireless signal at the second antennas of the m-number is stored in the correlation storage unit in advance and the actual correlation between the reception results of the m-number of the wireless signal, which are received by the second wireless communication unit, is acquired by the actual correlation acquisition unit.

It is determined whether the relative position acquisition system fails based on the result of comparison between the correlation between the reception results of the m-number stored in the correlation storage unit and the actual correlation between the reception results of the m-number acquired by the actual correlation acquisition unit. Accordingly, since whether the relative position acquisition system fails is capable of being determined while using the correlation between the reception results of the m-number of the wireless signal used in the acquisition of the relative position, it is possible to accurately perform the failure determination of the relative position acquisition system.

The failure determination apparatus for the relative position acquisition system may further include a notification unit that, if the failure determination unit determines that the relative position acquisition system fails, notifies the failure of the relative position acquisition system in the vehicle.

With the failure determination apparatus for the relative position acquisition system, since the failure of the relative position acquisition system is notified in the vehicle if the failure determination unit determines that the relative position acquisition system fails, it is possible for the driver of the vehicle to accurately recognize the failure of the relative position acquisition system.

In the failure determination apparatus for the relative position acquisition system, the power transmission unit may have an m-sided polygonal shape in a plan view, and the second antennas of the m-number may be arranged near the respective vertexes of the m-sided polygonal shape.

With the failure determination apparatus for the relative position acquisition system, since the power transmission unit has an m-sided polygonal shape in a plan view and the second antennas of the m-number are arranged near the respective vertexes of the m-sided polygonal shape, the distance between two adjacent antennas in the second antennas of the m-number is capable of being appropriately ensured. Accordingly, it is possible to improve the acquisition accuracy in the acquisition by the actual correlation acquisition unit of the actual correlation between the reception results of the m-number of the wireless signal received by the second wireless communication unit.

According to an aspect of the present disclosure, a failure determination method is provided for a relative position acquisition system including a power reception unit that is mounted in a vehicle, a power transmission unit for transmitting power to the power reception unit in a non-contact method, a first antenna provided for the power reception unit, a first wireless communication unit that transmits and receives a wireless signal via the first antenna, second antennas of an m-number (m is an integer not smaller than three) provided for the power transmission unit, a second wireless communication unit that transmits and receives the wireless signal to and from the first wireless communication unit via the second antennas of the m-number and the first antenna, and a relative position acquisition unit that acquires a relative position between the power reception unit and the power transmission unit based on reception results of the m-number of the wireless signal received via the second antennas of the m-number when the wireless signal transmitted from the first wireless communication unit is received by the second wireless communication unit via the second antennas of the m-number. The failure determination method includes storing correlation between the reception results of the m-number of the wireless signal at the second antennas of the m-number in a correlation storage unit in advance, acquiring actual correlation between the reception results of the m-number of the wireless signal received by the second wireless communication unit by an actual correlation acquisition unit, and determining whether the relative position acquisition system fails based on a result of comparison between the correlation between the reception results of the m-number stored in the correlation storage unit and the actual correlation between the reception results of the m-number acquired by the actual correlation acquisition unit.

BRIEF DESCRIPTION OF THE DRAWINGS

The advantages of the disclosure will become apparent in the following description taken in conjunction with the following drawings.

DESCRIPTION OF THE PREFERRED EMBODIMENTS

Figure 1:
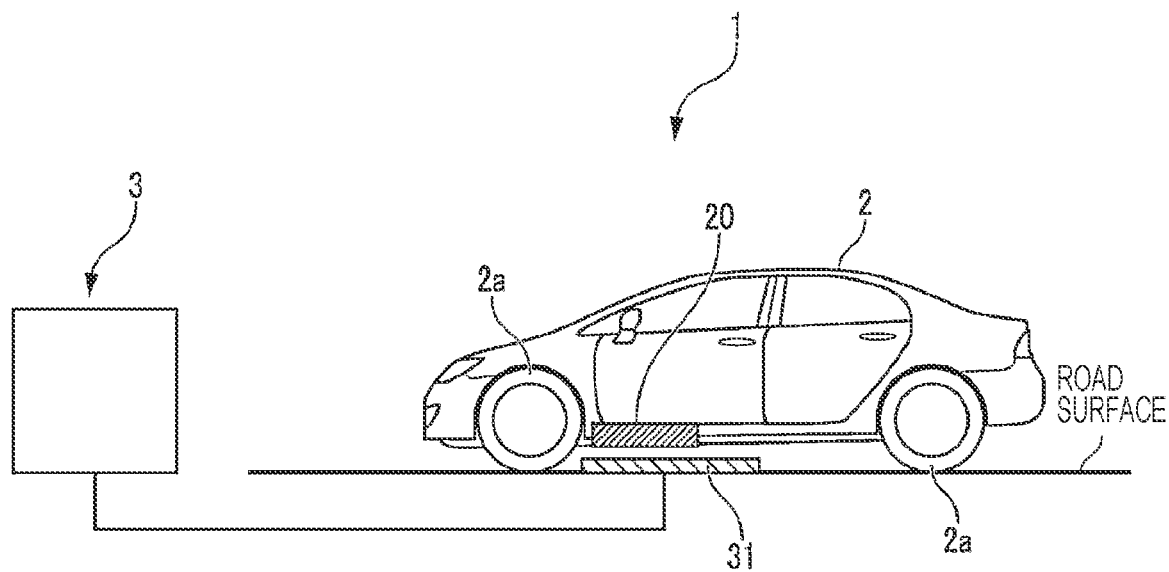
FIG. 1 is a diagram schematically illustrating the configuration of a relative position acquisition system to which a failure determination apparatus according to an embodiment of the present disclosure is applied.

A failure determination apparatus for a relative position acquisition system according to an embodiment of the present disclosure will herein be described with reference to FIG. 1 to FIG. 4. A relative position acquisition system 1 of the present embodiment also functions as a failure determination apparatus, the relative position acquisition system 1 will be described, along with the function and the configuration of the failure determination apparatus. In the following description, the left side in FIG. 4 is referred to as the "front", the right side in FIG. 4 is referred to as the "rear", the upper side in FIG. 4 is referred to as the "right", and the lower side in FIG. 4 is referred to as the "left" for convenience of description.

The relative position acquisition system 1 acquires the relative position between a power reception unit 20 of a vehicle 2 and a power transmission unit 31 of a power transmission apparatus 3 for the following reasons.

The vehicle 2 is a four-wheeled vehicle having four wheels 2a (only the two wheels are illustrated in FIG. 1) and is of an electric vehicle type using only a motor (not illustrated) as its power source. In the case of such an electric vehicle, it is necessary to perform charging when a state of charge (SOC) of a battery 22 (refer to FIG. 3) is decreased. Accordingly, the vehicle 2 is configured so as to perform the charging into the battery 22 in a non-contact method (a magnetic resonance method described below).

In such non-contact charging, it is necessary for the vehicle 2 to be parked while the power reception unit 20 of the vehicle 2 is being aligned so as to have chargeable positional relationship (refer to FIG. 1) with the power transmission unit 31 of the power transmission apparatus 3. In the case of the vehicle 2, a parking support control process (not illustrated) is performed to enable a driver to easily perform a parking operation.

In the parking support control process, it is necessary to accurately acquire the relative position between the power reception unit 20 and the power transmission unit 31 (hereinafter simply referred to as the "relative position") because a motor and a braking system (which are not illustrated in the drawings) of the vehicle 2 are controlled based on the relative position. The relative position is acquired in the relative position acquisition system 1 for the above reasons.

Figure 2:
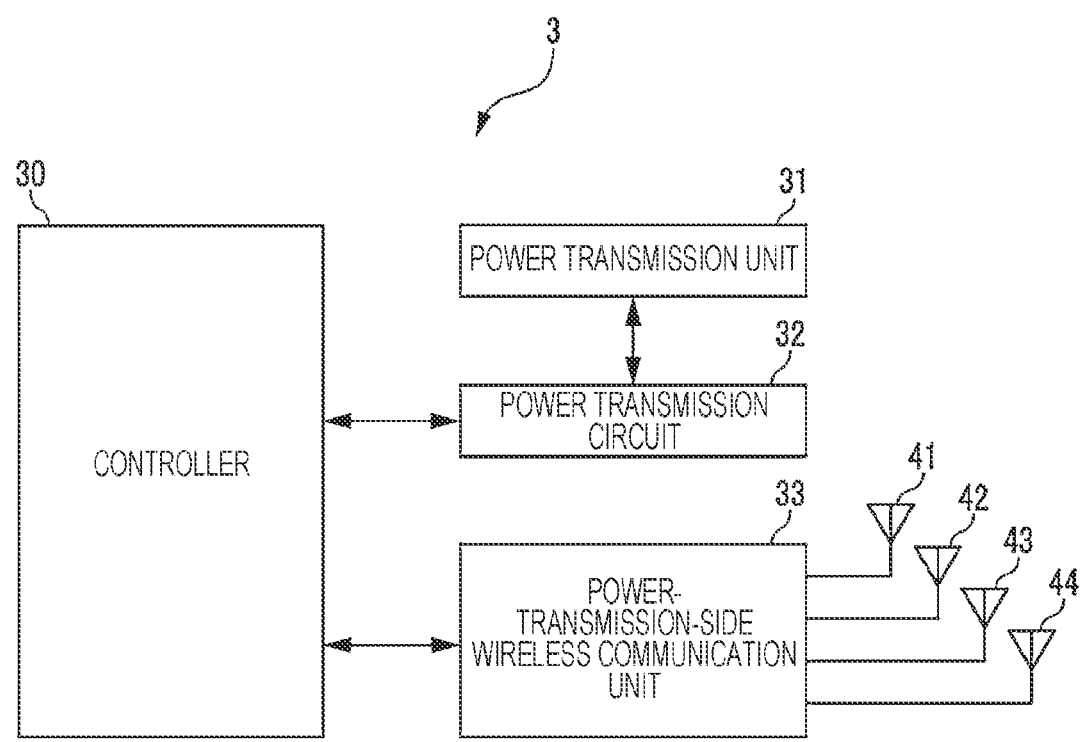
FIG. 2 is a block diagram illustrating the configuration of a power transmission apparatus in the relative position acquisition system.

The relative position acquisition system 1 is provided with the power transmission apparatus 3, which composes part of a non-contact charging system. As illustrated in FIG. 2, the power transmission apparatus 3 includes a controller 30, the power transmission unit 31, a power transmission circuit 32, a power-transmission-side wireless communication unit 33, and first to fourth power-transmission-side antennas 41 to 44. The power transmission unit 31 includes a power transmission coil (not illustrated), is arranged on the road surface of a parking space, and has a rectangular shape in a plan view (refer to FIG. 4).

The power transmission circuit 32 includes an alternating current power supply, a converter, and an inverter, which are not illustrated in the drawings. The power transmission circuit 32 performs a power transmission operation from the power transmission coil (not illustrated) in the power transmission unit 31 to a power reception coil (not illustrated) in the power reception unit 20 using the magnetic resonance method.

The power-transmission-side wireless communication unit 33 performs wireless communication with a vehicle-side wireless communication unit 23 described below and transmits and receives a wireless signal via the first to fourth power-transmission-side antennas 41 to 44, as described below. In the present embodiment, the power-transmission-side wireless communication unit 33 corresponds to a second wireless communication unit and the first to fourth power-transmission-side antennas 41 to 44 correspond to a second antenna.

The first to fourth power-transmission-side antennas 41 to 44 are built in the power transmission unit 31 in a state in which the first to fourth power-transmission-side antennas 41 to 44 are arranged at the four corners of the power transmission unit 31. As illustrated in FIG. 4, the first to second power-transmission-side antennas 41 to 42 are provided at the right end portion and the left end portion, respectively, on the front side of the power transmission unit 31 and are arranged so as to be axisymmetric to each other with respect to the center line in the front-back direction of the power transmission unit 31.

The third and fourth power-transmission-side antennas 43 to 44 are provided at the right end portion and the left end portion, respectively, on the rear side of the power transmission unit 31 and are arranged so as to be axisymmetric to each other with respect to the center line in the front-back direction of the power transmission unit 31. In addition, the first and third power-transmission-side antennas 41 and 43 are concentrically arranged in the front-back direction and the second and fourth power-transmission-side antennas 42 and 44 are also concentrically arranged in the front-back direction.

The power-transmission-side wireless communication unit 33 includes a wireless local area network (LAN) communication circuit (not illustrated) that performs the wireless communication using a wireless LAN method and a low frequency communication circuit (not illustrated) that performs the wireless communication using low frequency (LF) waves. In the following description, the wireless communication using the wireless LAN method is referred to as "wireless LAN communication" and the wireless communication using the low frequency waves is referred to as "low frequency communication". In the power-transmission-side wireless communication unit 33, the wireless LAN communication and the low frequency communication with the vehicle-side wireless communication unit 23 are controlled by an engine control unit (ECU) 10 in a manner described below.

The controller 30 is composed of a microcomputer including a central processing unit (CPU), a random access memory (RAM), a read only memory (ROM), an input-output (I/O) interface, and so on, which are not illustrated in the drawings. The controller 30 controls the power transmission operation by the power transmission circuit 32 and controls the wireless communication by the power-transmission-side wireless communication unit 33.

Figure 3:
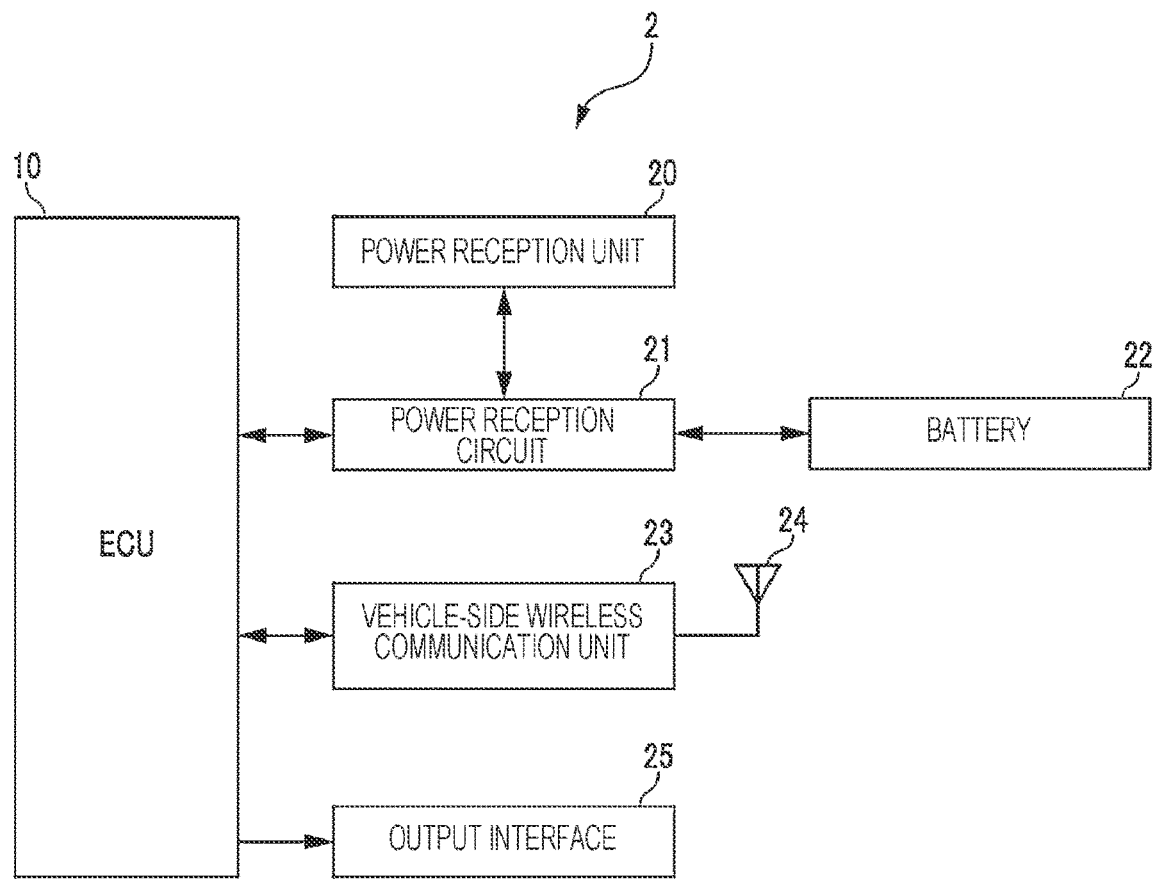
FIG. 3 is a block diagram illustrating the configuration of a vehicle side of the relative position acquisition system.
Figure 4:
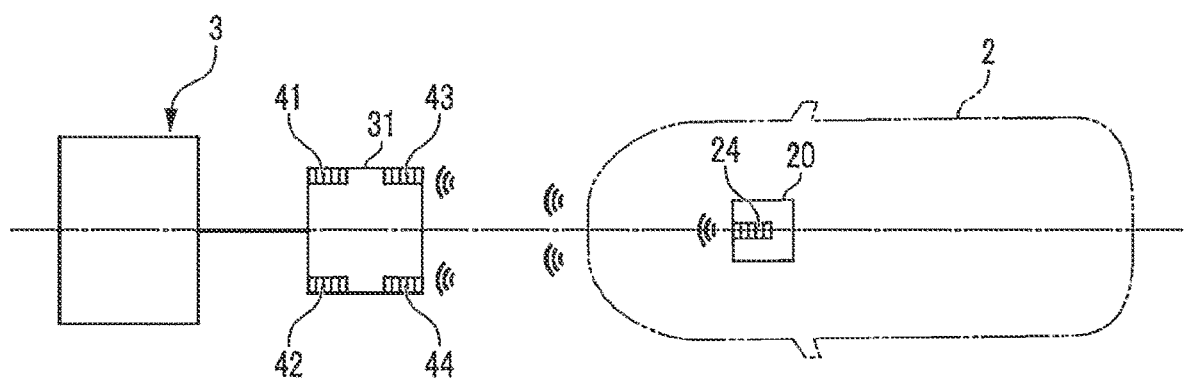
FIG. 4 is a plan view illustrating how first to fourth power-transmission-side antennas and a vehicle-side antenna are arranged.

As illustrated in FIG. 3, the vehicle 2 includes the ECU 10, the power reception unit 20, a power reception circuit 21, the battery 22, the vehicle-side wireless communication unit 23, a vehicle-side antenna 24, and an output interface 25. The ECU 10 is composed of a microcomputer including a CPU, a RAM, a ROM, an I/O interface, and so on, which are not illustrated in the drawings.

The power reception unit 20 is arranged so that the center of the power reception unit 20 coincides with a vehicle center line (refer to FIG. 4), is provided on the bottom face of the vehicle 2, and is electrically connected to the power reception circuit 21.

The power reception circuit 21 is composed of a capacitor, a rectifier circuit, and so on and is electrically connected to the ECU 10. The ECU 10 controls the power reception circuit 21 in the non-contact charging to charge the battery 22 with electric power supplied from the power transmission coil in the power transmission unit 31 to the power reception coil in the power reception unit 20.

The vehicle-side wireless communication unit 23 is electrically connected to the ECU 10 and includes a communication circuit that performs the wireless LAN communication and a communication circuit that performs the low frequency communication, like the power-transmission-side wireless communication unit 33 described above.

In the vehicle-side wireless communication unit 23, the wireless LAN communication and the low frequency communication are performed with the power-transmission-side wireless communication unit 33 via the vehicle-side antenna 24 under the control of the ECU 10. In the present embodiment, the vehicle-side wireless communication unit 23 corresponds to a first wireless communication unit and the vehicle-side antenna 24 corresponds to a first antenna.

In this case, a service set identifier (SSID) and a password of the vehicle-side wireless communication unit 23 are stored in the controller 30 in the power transmission apparatus 3 in advance. Pairing is automatically started between the vehicle-side wireless communication unit 23 and the power-transmission-side wireless communication unit 33 when the positional relationship between the vehicle 2 and the power transmission unit 31 is within a certain range along with the movement of the vehicle 2. This enables the wireless LAN communication between the vehicle-side wireless communication unit 23 and the power-transmission-side wireless communication unit 33.

The vehicle-side antenna 24 is arranged so that the center of the vehicle-side antenna 24 coincides with the vehicle center line and is incorporated in the front end portion of the power transmission unit 31.

The output interface 25 is composed of a speaker, a display, and so on and is electrically connected to the ECU 10. The speaker outputs various audio signals in the vehicle under the control of the ECU 10. The display is provided in a meter panel (not illustrated) and displays a variety of display information under the control of the ECU 10. In the present embodiment, the output interface 25 corresponds to a notification unit.

The ECU 10 controls the vehicle-side wireless communication unit 23, the output interface 25, and so on based on a control program in the ROM to perform various control processes including a relative position calculation process (not illustrated) and a failure determination control process described below. In the present embodiment, the ECU 10 corresponds to a relative position acquisition unit, a correlation storage unit, an actual correlation acquisition unit, a failure determination unit, and the notification unit.

A method of acquiring the relative position in the relative position acquisition system 1 of the present embodiment and a method of determining whether the relative position acquisition system 1 fails will now be described. First, the method of acquiring the relative position is described.

In the acquisition of the relative position, first, a low frequency signal is transmitted from the vehicle-side wireless communication unit 23 to the power transmission unit 31 side via the vehicle-side antenna 24. Upon reception of the low frequency signal via the first to fourth power-transmission-side antennas 41 to 44, the power-transmission-side wireless communication unit 33 acquires a reception intensity Lp of the low frequency signal in each of the first to fourth power-transmission-side antennas 41 to 44.

In the following description, the reception intensity of the low frequency signal at the first power-transmission-side antenna 41 is referred to as a "first reception intensity $Lp1$", the reception intensity of the low frequency signal at the second power-transmission-side antenna 42 is referred to as a "second reception intensity $Lp2$", the reception intensity of the low frequency signal at the third power-transmission-side antenna 43 is referred to as a "third reception intensity $Lp3$", and the reception intensity of the low frequency signal at the fourth power-transmission-side antenna 44 is referred to as a "fourth reception intensity $Lp4$".

Next, the power-transmission-side wireless communication unit 33 transmits a wireless LAN signal including data about the first to fourth reception intensities $Lp1$ to $Lp4$ to the vehicle-side wireless communication unit 23 via the first to fourth power-transmission-side antennas 41 to 44.

Upon reception of the wireless LAN signal including the data about the first to fourth reception intensities $Lp1$ to $Lp4$ by the vehicle-side wireless communication unit 23, the ECU 10 calculates (acquires) a relative distance using a calculation method described below based on the first to fourth reception intensities $Lp1$ to $Lp4$.

As illustrated in FIG. 4, in the state in which the center line of the vehicle 2 coincides with the center line of the power transmission unit 31, the distance between the first power-transmission-side antenna 41 and the vehicle-side antenna 24 (hereinafter referred to as a "first distance between antennas") is equal to the distance between the second power-transmission-side antenna 42 and the vehicle-side antenna 24 (hereinafter referred to as a "second distance between antennas") due to the arrangement of the vehicle-side antenna 24 described above and the first to fourth power-transmission-side antennas 41 to 44 described above. As a result, $Lp1 \approx Lp2$ is established between the first reception intensity $Lp1$ and the second reception intensity $Lp2$.

In addition, the distance between the third power-transmission-side antenna 43 and the vehicle-side antenna 24 (hereinafter referred to as a "third distance between antennas") is equal to the distance between the fourth power-transmission-side antenna 44 and the vehicle-side antenna 24 (hereinafter referred to as a "fourth distance between antennas"). As a result, $Lp3 \approx Lp4$ is established between the third reception intensity $Lp3$ and the fourth reception intensity $Lp4$. Furthermore, the four reception intensities $Lp1$ to $Lp4$ are increased with the decreasing distance between the vehicle 2 and the power transmission unit 31.

Figure 5:
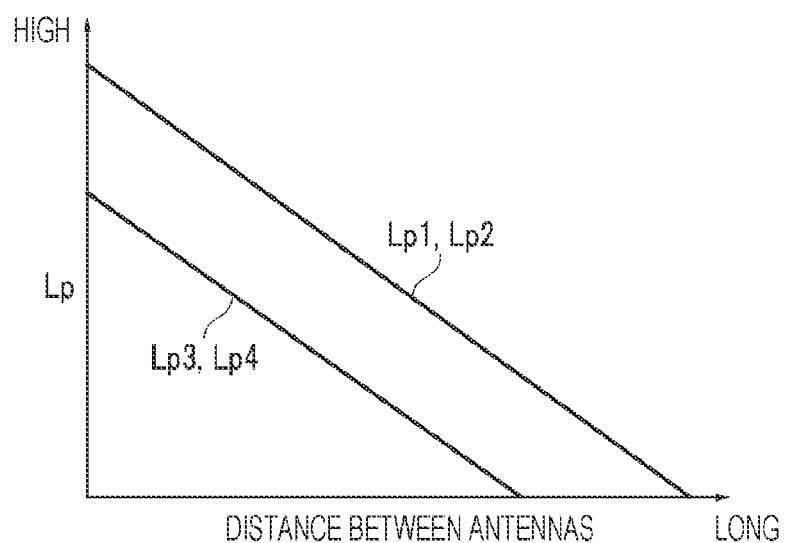
FIG. 5 is a map indicating the relationship between four reception intensities and the four antennas.

For the above reasons, the correlations illustrated in a map in FIG. 5 are established between the four reception intensities $Lp1$ to $Lp4$ and the four distances between antennas in the state in which the center line of the vehicle 2 coincides with the center line of the power transmission unit 31.

Accordingly, first, the ECU 10 searches the map in FIG. 5 based on the first to fourth reception intensities $Lp1$ to $Lp4$ to calculate the first to fourth distances between antennas. Then, the ECU 10 estimates the angle between the center line of the vehicle 2 and the center line of the power transmission unit 31 (the angle in a plan view of the vehicle 2) using a certain estimation method based on the deviation between the first distance between antennas and the second distance between antennas and the deviation between the third distance between antennas and the fourth distance between antennas. Then, the ECU 10 calculates the relative position using a certain calculation method (for example, a map search method or a certain arithmetic expression) based on the estimated angle and the first to fourth distances between antennas.

Next, the method of determining whether the relative position acquisition system 1 fails is described. In this failure determination method, it is determined whether the four power-transmission-side antennas 41 to 44 normally operate on the assumption that the vehicle-side antenna 24, the vehicle-side wireless communication unit 23, and the power-transmission-side wireless communication unit 33 normally operate.

Conditions are supposed, in which the vehicle 2 is configured so as to come close to the power transmission unit 31 only through forward movement due to the arrangement of the power transmission unit 31 in the parking space, all the first to fourth power-transmission-side antennas 41 to 44 normally operate, and the vehicle 2 is moving to the power transmission unit 31.

In such conditions, even if the center line of the vehicle 2 is shifted from the center line of the power transmission unit 31, all the following expressions (1) to (8) are established for the first to fourth reception intensities $Lp1$ to $Lp4$ due to the arrangement of the four power-transmission-side antennas 41 to 44 described above:

$$DLp1 > 0 \quad (1)$$

$$DLp2 > 0 \quad (2)$$

$$DLp3 > 0 \quad (3)$$

$$DLp4 > 0 \quad (4)$$

$$Lp3 > Lp1 \quad (5)$$

$$Lp4 > Lp2 \quad (6)$$

$$|Lp1 - Lp2| < Dref1 \quad (7)$$

$$|Lp3 - Lp4| < Dref2 \quad (8)$$

$DLp1$ in the above expression (1) denotes the variation of the first reception intensity $Lp1$ per unit time (that is, the deviation between the current value and the last value), and the same applies to $DLp2$ to $DLp4$ in the expressions (2) to (4), respectively. $Dref1$ in the expression (7) and $Dref2$ in the expression (8) are certain determination values and are set through the search in a map (not illustrated) based on the relative position and the angle between the center line of the vehicle 2 and the center line of the power transmission unit 31. The values that were acquired when it was determined that the relative position acquisition system 1 is normally operates at the last timing of the failure determination are used as the relative position and the angle in this case.

Accordingly, if at least one of the above expressions (1) to (8) is not established, it is estimated that at least one of the first to fourth power-transmission-side antennas 41 to 44 fails and it is determined that the relative position acquisition system 1 fails.

Figure 6:
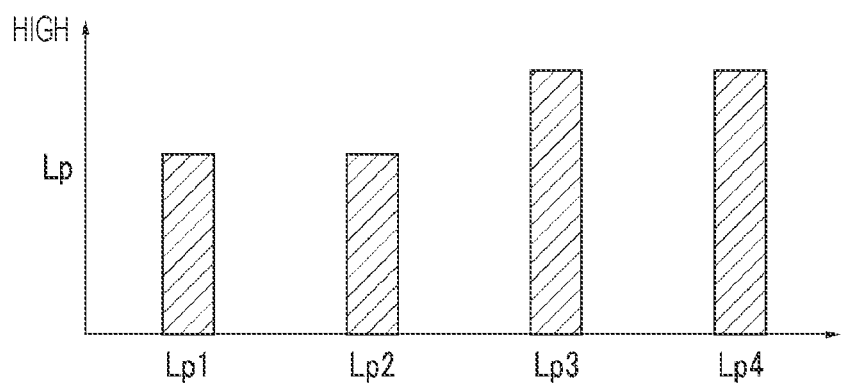
FIG. 6 is a graph indicating the relationship between the first to fourth reception intensities when the first to fourth power-transmission-side antennas normally operate.

For example, if the four power-transmission-side antennas 41 to 44 normally operate when the positional relationship illustrated in FIG. 4 is established between the vehicle 2 and the power transmission unit 31, the above expressions (1) to (8) are established and $Lp1=Lp2$ and $Lp3$ $Lp4$ are established. Accordingly, the first to fourth reception intensities Lp1 to Lp4 have the correlation illustrated in FIG. 6.

Figure 7:
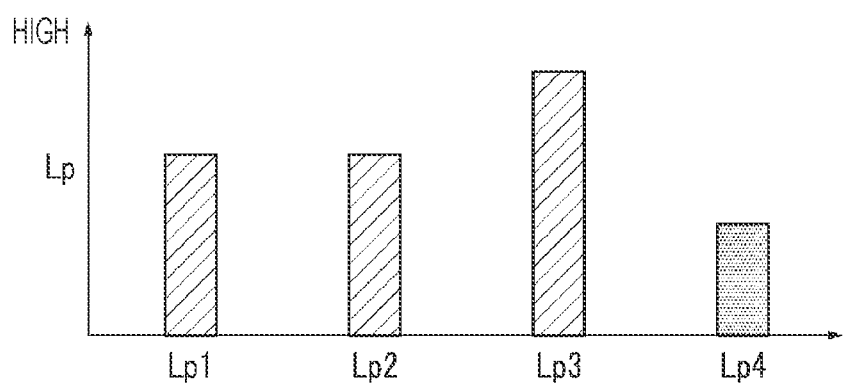
FIG. 7 is a graph indicating the relationship between the first to fourth reception intensities when the fourth power-transmission-side antenna fails.

In contrast, for example, if the above expression (6) is not established because the fourth power-transmission-side antenna 44 fails, as illustrated in FIG. 7, it is determined that the relative position acquisition system 1 fails.

In addition, for example, if DLp1=0 is established despite the fact that the vehicle 2 is moving, the first power-transmission-side antenna 41 fails and it is determined that the relative position acquisition system 1 fails. In the present embodiment, whether the relative position acquisition system 1 fails is determined using the above method.

A process to determine whether the relative position acquisition system 1 fails will now be described with reference to FIG. 8. The failure determination process is performed to determine whether the relative position acquisition system 1 fails using the above determination method and is performed by the ECU 10 on a certain control cycle. Various values calculated or set in the following description are stored in the RAM in the ECU 10.

Figure 8:
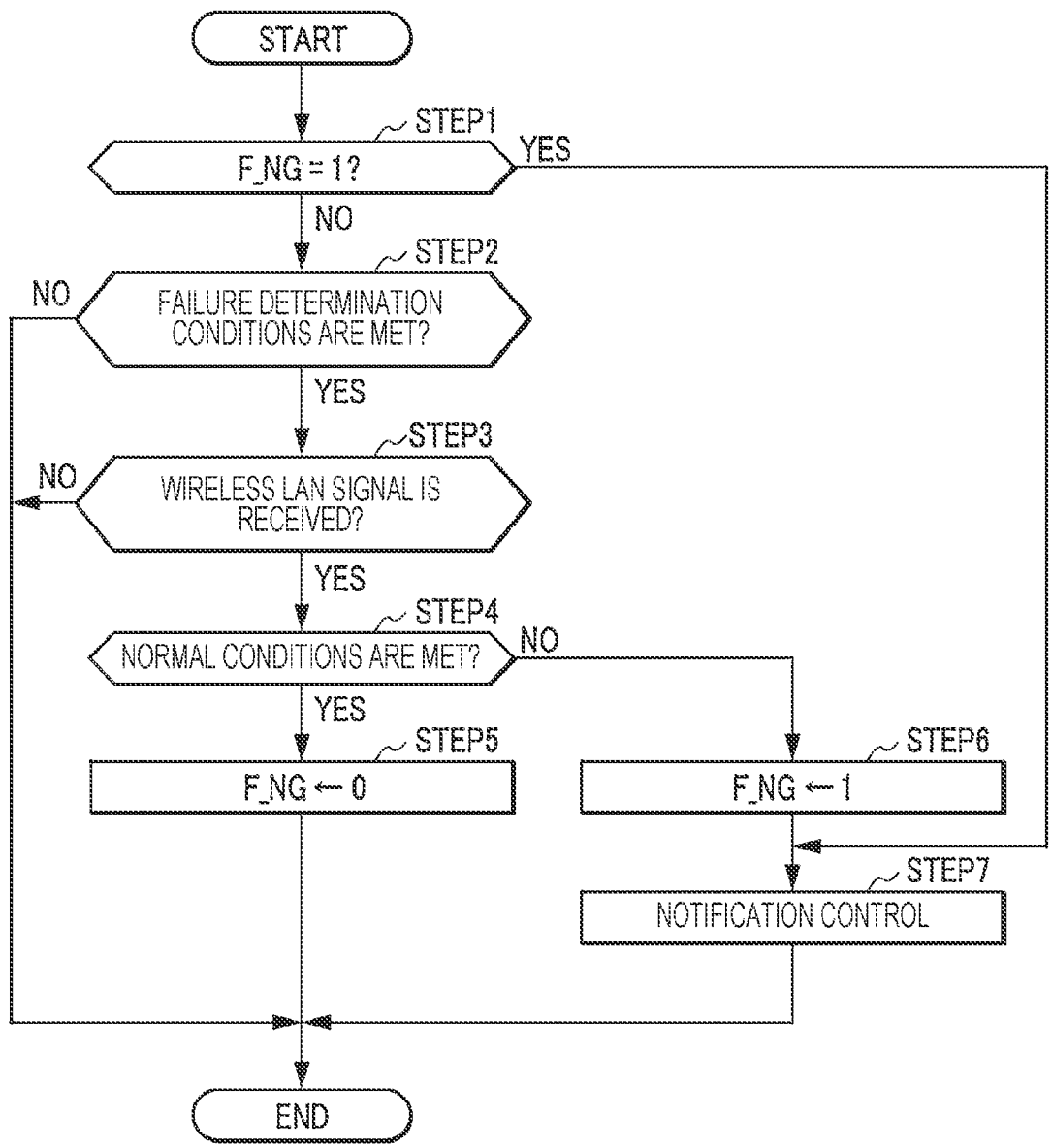
FIG. 8 is a flowchart illustrating a failure determination process.

Referring to FIG. 8, in STEP1, the ECU 10 determines whether a failure flag F_NG stored in the RAM is set to one ("1"). The failure flag F_NG indicates whether the relative position acquisition system 1 fails and the initial value of the failure flag F_NG is set to zero ("0").

If the determination here is affirmative (YES in STEP1) and the ECU 10 determined that the relative position acquisition system 1 fails at the last or previous control timing, the process goes to STEP7 described below.

If the determination here is negative (NO in STEP1), in STEP2, the ECU 10 determines whether failure determination conditions of the relative position acquisition system 1 are met.

The ECU 10 determines that the failure determination conditions of the relative position acquisition system 1 are met if all the following conditions (f1) to (f3) are met and, otherwise, determines that the failure determination conditions are not met.

(f1) All the vehicle-side antenna 24, the vehicle-side wireless communication unit 23, and the power-transmission-side wireless communication unit 33 normally operate.

(f2) The vehicle 2 is moving.

(f3) The low frequency signal has been transmitted from the vehicle-side wireless communication unit 23 to the power-transmission-side wireless communication unit 33 before the current control timing.

If the determination here is negative (NO in STEP2) and the failure determination conditions are not met, the process illustrated in FIG. 8 is terminated.

If the determination here is affirmative (YES in STEP2) and the failure determination conditions are met, in STEP3, the ECU 10 determines whether the vehicle-side wireless communication unit 23 receives the wireless LAN signal from the power-transmission-side wireless communication unit 33. The wireless LAN signal includes the data about the first to fourth reception intensities Lp1 to Lp4, as described above.

If the determination here is negative (NO in STEP3) and the vehicle-side wireless communication unit 23 does not receive the wireless LAN signal, the process illustrated in FIG. 8 is terminated. If the determination here is affirmative (YES in STEP3) and the vehicle-side wireless communication unit 23 receives the wireless LAN signal, in STEP4, the ECU 10 determines whether normal conditions are met.

The normal conditions indicate that the relative position acquisition system 1 is normally operates. Specifically, the ECU 10 determines that the normal conditions are met if all the expressions (1) to (8) described above are established and, otherwise, determines that the normal conditions are not met.

If the determination here is affirmative (YES in STEP4) and the normal conditions are met, in STEP5, the ECU 10 sets the failure flag F_NG to zero ("0") to indicate that the relative position acquisition system 1 normally operates and, then, the process illustrated in FIG. 8 is terminated.

If the determination here is negative (NO in STEP4) the normal conditions are not met, in STEP6, the ECU 10 sets the failure flag F_NG to one ("1") to indicate that the relative position acquisition system 1 fails.

If the failure flag F_NG is set to one ("1") or the ECU 10 determined that the relative position acquisition system 1 fails at the last or previous control timing (YES in STEP1), in STEP7, the ECU 10 performs a notification control process.

In the notification control process, only at the first time, an audio signal indicating that the relative position acquisition system 1 fails is output from the speaker of the output interface 25 in the vehicle 2 and a symbol and characters indicating that the relative position acquisition system 1 fails are displayed in the display of the output interface 25. After the notification control process is performed in the above manner, the process illustrated in FIG. 8 is terminated.

In the failure determination process in FIG. 8, whether the relative position acquisition system 1 fails is determined in the above manner. In this case, in the present embodiment, the determination of whether all the expressions (1) to (8) are established in the manner described above corresponds to comparison between the correlation between reception results of an m-number stored in the correlation storage unit and the actual correlation between the reception results of the m-number acquired by the actual correlation acquisition unit, and the inclusion of the process to determine whether the expressions (1) to (8) are established in the control program in the ROM in the ECU 10 corresponds to storage of the correlation between the reception results of the m-number in the correlation storage unit.

As described above, with the relative position acquisition system 1 of the present embodiment, when the low frequency signal transmitted from the vehicle-side wireless communication unit 23 is received by the four power-transmission-side antennas 41 to 44, the four reception intensities Lp1 to Lp4 in the respective antennas are acquired and the relative position between the power reception unit 20 and the power transmission unit 31 is acquired based on the reception intensities Lp1 to Lp4.

The ECU 10 determines whether the relative position acquisition system 1 fails based on whether all the expressions (1) to (8) described above are established for the four reception intensities Lp1 to Lp4. Accordingly, it is possible to accurately perform the failure determination of the relative position acquisition system 1 while using the correlation between the four reception intensities Lp1 to Lp4 of the low frequency signal used in the acquisition of the relative position.

Since the power transmission unit 31 has a rectangular shape in a plan view and the four power-transmission-side antennas 41 to 44 are arranged near the respective vertexes of the rectangle, the distance between two adjacent antennas in the four power-transmission-side antennas 41 to 44 is capable of being appropriately ensured. Accordingly, it is possible to improve the determination accuracy in the acquisition of the four reception intensities Lp1 to Lp4 and the determination of whether the expressions (1) to (8) described above are established.

Since the failure of the relative position acquisition system 1 is notified in the vehicle 2 via the output interface 25 if it is determined that the relative position acquisition system 1 fails, the driver of the vehicle 2 is capable of accurately recognizing the failure of the relative position acquisition system 1.

Although the example is described in the present embodiment in which the power transmission unit 31 of a rectangular shape in a plan view is used, the power transmission unit of a triangle shape in a plan view or the power transmission unit of a polygonal shape, such as a pentagonal shape or more, in a plan view may be used, instead of the power transmission unit 31 of a rectangular shape in a plan view. In this case, at least three or five power transmission-side antennas are arranged near the vertexes of the polygon of the power transmission unit as the second antennas of the m-number.

Although the example is described in the present embodiment in which the vehicle 2 of an electric vehicle type using only the motor as its power source is used, the vehicle of a hybrid vehicle type using the motor and an internal combustion engine as its power sources may be used, instead of the vehicle 2 of an electric vehicle type using only the motor as its power source.

Although the example is described in the present embodiment in which the low frequency signal is transmitted to the power-transmission-side wireless communication unit 33 via the one vehicle-side antenna 24, the low frequency signal may be transmitted to the power-transmission-side wireless communication unit 33 via the multiple vehicle-side antennas 24, instead of the one vehicle-side antenna 24. Also in this case, the failure determination of the relative position acquisition system 1 is performed based on the values of the reception intensities of the four antennas in the power-transmission-side wireless communication unit 33.

Although the example is described in the present embodiment in which the low frequency signal is used as the wireless signal transmitted from the vehicle-side wireless communication unit 23 to the power-transmission-side wireless communication unit 33, a very low frequency signal or a medium frequency signal may be used, instead of the low frequency signal.

Although the example is described in the present embodiment in which the wireless LAN signal is used as the wireless signal transmitted from the power-transmission-side wireless communication unit 33 to the vehicle-side wireless communication unit 23, a very high frequency signal, a microwave signal, or the like may be used, instead of the wireless LAN signal.

Although the example is described in the present embodiment in which it is determined whether the relative position acquisition system 1 fails based on whether all the expressions (1) to (8) described above are established, the failure determination method of the present disclosure is not limited to this. It sufficient for the failure determination method to determine whether the relative position acquisition system 1 fails based on the result of comparison between the correlation between the reception results of the m-number stored in the correlation storage unit and the actual correlation between the reception results of the m-number acquired by the actual correlation acquisition unit.

For example, it may be determined whether the relative position acquisition system 1 fails by creating a map in which the correlation between the first to fourth reception intensities Lp1 to Lp4 when the relative position acquisition system 1 normally operates and the correlation between the first to fourth reception intensities Lp1 to Lp4 when the relative position acquisition system 1 fails are defined in advance, storing the map in the ROM in the ECU 10, and searching the map based on the actual first to fourth reception intensities Lp1 to Lp4.

Although the example is described in the present embodiment in which the ECU 10 determines whether the relative position acquisition system 1 fails, the controller 30 in the power transmission apparatus 3 may determine whether the relative position acquisition system 1 fails, instead of the ECU 10. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A failure determination apparatus for a relative position acquisition system including a power reception unit that is mounted in a vehicle, a power transmission unit for transmitting power to the power reception unit in a non-contact method, a first antenna provided for the power reception unit, a first wireless communication unit that transmits and receives a wireless signal via the first antenna, second antennas of an m-number (m is an integer not smaller than three) provided for the power transmission unit, a second wireless communication unit that transmits and receives the wireless signal to and from the first wireless communication unit via the second antennas of the m-number and the first antenna, and a relative position acquisition unit that acquires a relative position between the power reception unit and the power transmission unit based on reception results of the m-number of the wireless signal received via the second antennas of the m-number when the wireless signal transmitted from the first wireless communication unit is received by the second wireless communication unit via the second antennas of the m-number, the failure determination apparatus comprising:
    a correlation storage that stores in advance correlation between the reception results of the m-number of the wireless signal at the second antennas of the m-number;
    an actual correlation acquisition unit that acquires actual correlation between the reception results of the m-number of the wireless signal received by the second wireless communication unit; and
    a failure determination unit that determines whether the relative position acquisition system fails based on a result of comparison between:
        the stored correlation between the reception results of the m-number stored in the correlation storage and
        the actual correlation between the reception results of the m-number acquired by the actual correlation acquisition unit.

2. The failure determination apparatus for the relative position acquisition system according to claim 1, further comprising:
    a notification unit that, when the failure determination unit determines that the relative position acquisition system fails, notifies the failure of the relative position acquisition system to the vehicle.

3. The failure determination apparatus for the relative position acquisition system according to claim 1,
    wherein the power transmission unit has an m-sided polygonal shape in a plan view, and wherein the second antennas of the m-number are arranged near the respective vertexes of the m-sided polygonal shape.

4. The failure determination apparatus for the relative position acquisition system according to claim 1,
wherein the failure determination unit determines whether the vehicle is in moving state, and if not, the failure determination unit avoids determination whether the relative position acquisition system fails.

5. The failure determination apparatus for the relative position acquisition system according to claim 4,
wherein the failure determination unit performs determination whether the relative position acquisition system fails when the vehicle is in moving state, and
the failure determination unit determines that the relative position acquisition system fails when variation of reception signal intensity per unit time at either one of the second antennas is zero.

6. The failure determination apparatus for the relative position acquisition system according to claim 1,
wherein the first wireless communication unit sends a first wireless signal to the second wireless communication unit,
the second wireless communication unit sends a second wireless signal to the first wireless communication unit, and
the first wireless signal has a first wavelength longer than a wavelength of the second wireless signal.

7. A failure determination method for a relative position acquisition system including a power reception unit that is mounted in a vehicle, a power transmission unit for transmitting power to the power reception unit in a non-contact method, a first antenna provided for the power reception unit, a first wireless communication unit that transmits and receives a wireless signal via the first antenna, second antennas of an m-number (m is an integer not smaller than three) provided for the power transmission unit, a second wireless communication unit that transmits and receives the wireless signal to and from the first wireless communication unit via the second antennas of the m-number and the first antenna, and a relative position acquisition unit that acquires a relative position between the power reception unit and the power transmission unit based on reception results of the m-number of the wireless signal received via the second antennas of the m-number when the wireless signal transmitted from the first wireless communication unit is received by the second wireless communication unit via the second antennas of the m-number, the failure determination method comprising:
storing correlation between the reception results of the m-number of the wireless signal at the second antennas of the m-number in a correlation storage in advance;
acquiring actual correlation between the reception results of the m-number of the wireless signal received by the second wireless communication unit by an actual correlation acquisition unit; and
determining whether the relative position acquisition system fails based on a result of comparison between:
the stored correlation between the reception results of the m-number stored in the correlation storage and
the actual correlation between the reception results of the m-number acquired by the actual correlation acquisition unit.

8. A failure determination method for a relative position acquisition system including a power reception unit that is mounted in a vehicle, a power transmission unit for transmitting power to the power reception unit in a non-contact method, a first antenna provided for one of the power reception unit or the power transmission unit, a first wireless communication unit that transmits and receives a wireless signal via the first antenna, second antennas of an m-number (m is an integer not smaller than three) provided for the other of the power reception unit or the power transmission unit, a second wireless communication unit that transmits and receives the wireless signal to and from the first wireless communication unit via the second antennas of the m-number and the first antenna, and a relative position acquisition unit that acquires a relative position between the power reception unit and the power transmission unit based on reception results of the m-number of the wireless signal received via the second antennas of the m-number when the wireless signal transmitted from the first wireless communication unit is received by the second wireless communication unit via the second antennas of the m-number, the failure determination method comprising:
storing correlation between the reception results of the m-number of the wireless signal at the second antennas of the m-number in a correlation storage in advance;
acquiring by a computer actual correlation between the reception results of the m-number of the wireless signal received by the second wireless communication unit; and
determining by a computer whether the relative position acquisition system fails based on a result of comparison between:
the stored correlation between the reception results of the m-number stored in the correlation storage and
the actual correlation between the reception results of the m-number.

* * * * *